Feb. 17, 1925.

F. C. HUGHES 1,526,857

TIRE VALVE CASING CAP

Filed Oct. 4, 1923

Inventor:
Frank C. Hughes,
By Dyrenforth, Lee, Chritton & Wiles,
Attys.

Patented Feb. 17, 1925.

1,526,857

UNITED STATES PATENT OFFICE.

FRANK C. HUGHES, OF CHICAGO, ILLINOIS.

TIRE-VALVE-CASING CAP.

Application filed October 4, 1923. Serial No. 666,498.

*To all whom it may concern:*

Be it known that I, FRANK C. HUGHES, a citizen of the United States, residing at Chicago, in the county of Cook and State of Illinois, have invented a new and useful Improvement in Tire-Valve-Casing Caps, of which the following is a specification.

This invention relates to improvements in tire valve casing caps more especially adapted for use in connection with automobile tire valves. My improved cap is designed to effectually prevent the escape of air from an automobile tire. The ordinary automobile tire has a check valve adapted to prevent the escape of air but frequently such check valves have slow leaks and consequently it is customary to provide an additional cap for the end of the casing in which the check valve is located to stop the passage of any air that may pass the check valve. The check valve is ordinarily provided with a valve stem or pin, the end of which frequently extends a short distance beyond the end of the valve casing. If this valve stem is pushed inwardly or moved to one side it causes an unseating of the check valve which is likely to permit dust or dirt to get in the check valve or cause it to be otherwise damaged. It is desirable, therefore, to provide a cap for the end of the valve casing which will not in any way interfere with the projecting end of the valve stem. My improved cap, however, is so designed that it will make a tight air joint at the end of the valve casing and thus hold air whether the valve stem is pressed inwardly or not. The cap is preferably made, however, so that when screwed down tightly, the projecting end of the valve stem is not disturbed. My improved cap can be cheaply and easily made, is neat in appearance and strong and durable and gives a tight air joint. Other features and advantages of my improved cap will appear more fully as I proceed with my specification.

Figure 1:
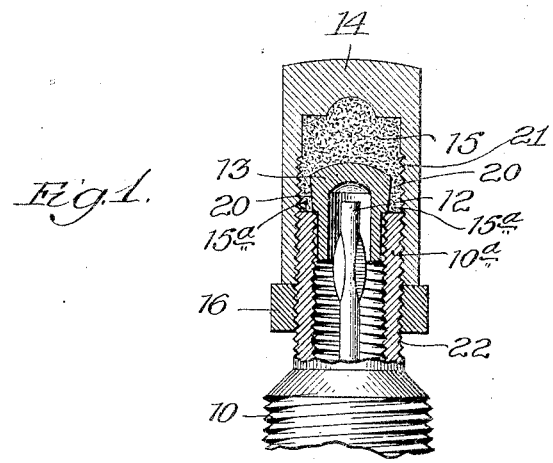
Figure 2:
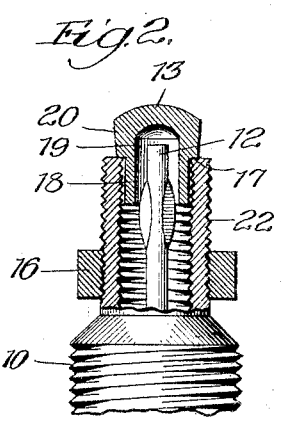
Figure 3:
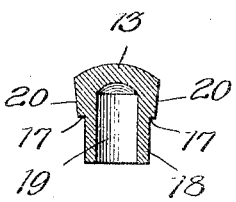
Figure 4:
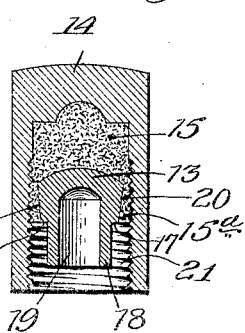
Figure 5:
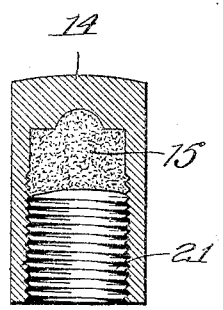

In that form of device embodying the features of my invention shown in the accompanying drawings, Figure 1 is a vertical sectional view of the upper end of a tire valve casing showing my improved cap in place; Fig. 2 is a similar view of the end of a valve casing showing the small valve stem protecting cap in place but the cap proper not yet applied; and also showing the lock nut; Fig. 3 is a similar view of the inner member of the cap; Fig. 4 is a similar view of the cap removed from the valve casing, and Fig. 5 is a vertical sectional view of the outer part of the completed cap showing the same with the inner cap removed therefrom.

As shown in the drawings, 10 indicates the upper part of an ordinary tire valve casing. The upper end of this casing, as indicated by $10^a$ is reduced in diameter and externally and internally threaded. The internal threads are used for putting in place the check valve, this commonly being referred to as the valve "insides" and screwed into place in the valve casing from the top by means of the internal threads. This check valve has a valve stem or pin 12, the end of which ordinarily projects a short distance beyond the end of the casing $10^a$ as shown.

My improved cap is designed to be screwed on to the external threads of the reduced upper end or nipple $10^a$ of the valve casing. The valve cap comprises primarily two parts, namely a small inner cap 13 and a larger outer cap proper 14. These two parts together form the complete cap as shown in Fig. 4, 15 indicating packing of any suitable material as, for example, asbestos, fibre, cotton and the like. I have found it desirable to use asbestos and moisten the same with some solution such as, for example, calcium chloride, dextrine, oil or the like.

16 indicates a lock nut which may be used, if desired, to assist in holding the cap in place. When such a lock nut is used it is screwed on to the end of the valve casing before the cap is put in place and screwed down as far as possible so that the valve cap may be applied and screwed tightly in place without engaging the lock nut. The lock nut is then screwed back until it engages the cap and locks it in place.

The small cap 13 is provided with a shoulder 17 adapted to seat on the end of the valve casing, the reduced lower end portion 18 of the cap entering the end of the valve casing. The small cap 13 is preferably provided with a recess 19 large enough and high enough to accommodate the projecting end of the valve stem 12 and prevent it from being pressed inwardly or otherwise moved. Even though the recess 19 is not large enough or high enough to accommodate the end of the valve stem, so that the valve stem is forced downwardly or to one side by the cap, the cap will nevertheless hold air, because it makes a tight air joint at the end of the valve casing. It will be noted that the upper part of the cap 13 above the shoulder 17 is substantially cylindrical but that it is somewhat tapered downwardly as indicated by 20. The larger outer cap proper 14 is provided with internal threads 21 adapted to engage the external threads 22 on the nipple 10ª.

I have found it desirable to assemble the cap in the following manner. The small cap 13 is first put in place as shown in Fig. 2. The outer cap 14 is then partially filled with packing material 15 as shown in Fig. 5. The outer cap is then screwed down tightly on the nipple 10ª. As this is done, the packing 15 is forced downwardly around the sides of the cap 13 as indicated by 15ª in Fig. 1 and forced tightly against the upper edge of the nipple 10ª and down around the external threads making a tight air joint. The cap 13 prevents the end of the valve stem 12 from being engaged if the recess 19 is deep and large enough. The taper or undercutting 20 on the smaller cap 13 causes this cap to be tightly held in place in the outer cap by the packing 15ª after the outer cap has once been tightly applied to the valve casing; so that after this, when the outer cap 14 is removed, the small cap 13 comes with it, the two parts being thereafter held together to form one complete cap as shown in Fig. 4.

It will be seen from the drawings that the reduced lower end portion 18 of the small cap 13 is of such a size as to fit snugly into the end of the valve casing. It will be seen also that the shoulder 17 of the small protecting cap rests on the end of the valve casing. Because of this construction it will be seen that the packing material 15 is always prevented from entering the end of the valve casing. Since the reduced lower end portion 18 of the small cap is cylindrical and fits snugly in the end of the valve casing, it will be seen that this small cap plugs, stops up, or closes the end of the valve casing and always prevents the packing material from being forced or oozing into the interior of the valve casing itself. No matter how tightly the large cap is screwed into place, none of the packing material can be squeezed down into the valve casing since the small cap 13 acts as a closing member. It has been found that the shoulder 17 is not always necessary. With some kinds of packing such as, for example, rubber, the shoulder may be dispensed with. Even though the large cap is screwed very tightly into place, the small cap is not forced too far into the valve casing. Since the small cap fits snugly into the upper end of the valve casing and is cylindrical, it operates to close, or plug, or stop up, the upper end of the valve casing, thus preventing any of the packing material from escaping or being forced into the end of the valve casing, no matter how tightly the large cap is screwed into place, and this happens whether the shoulder 17 is provided or not.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A valve casing cap comprising; a cap proper having internal threads adapted to engage the external threads of a valve casing; packing material within said cap adapted to be pressed down onto the edge of a valve casing when said cap is screwed into place; and a separate closing member within said cap adapted to close the end of a valve casing and prevent said packing from being forced thereinto as the cap is screwed into place.

2. A valve casing cap comprising; a cap proper having internal threads adapted to engage the external threads of a valve casing; packing material within said cap adapted to be pressed down onto the edge of a valve casing when said cap is screwed into place; and a separate closing member within said cap adapted to close the end of a valve casing and prevent said packing from being forced thereinto as the cap is screwed into place, said closing member provided with a part adapted to bear against the upper edge of the valve casing.

3. A tire valve casing cap comprising; a cap proper having internal threads adapted to engage the external threads of a tire valve casing; packing material within said cap proper; and a member imbedded in said packing material adapted to close the end of a tire valve casing when the cap proper is screwed into place, said closing member having a cylindrical portion adapted to fit snugly into the end of the valve casing.

4. A tire valve casing cap comprising; a cap proper having internal threads adapted to engage the external threads of a tire valve casing; packing material within said cap proper; and a member imbedded in said packing material adapted to close the end of a tire valve casing when the cap proper is screwed into place, said closing member being undercut where imbedded in said packing material.

Witness my hand and seal this 2 day of October, 1923.

FRANK C. HUGHES. [L. S.]